(No Model.)
5 Sheets—Sheet 2.

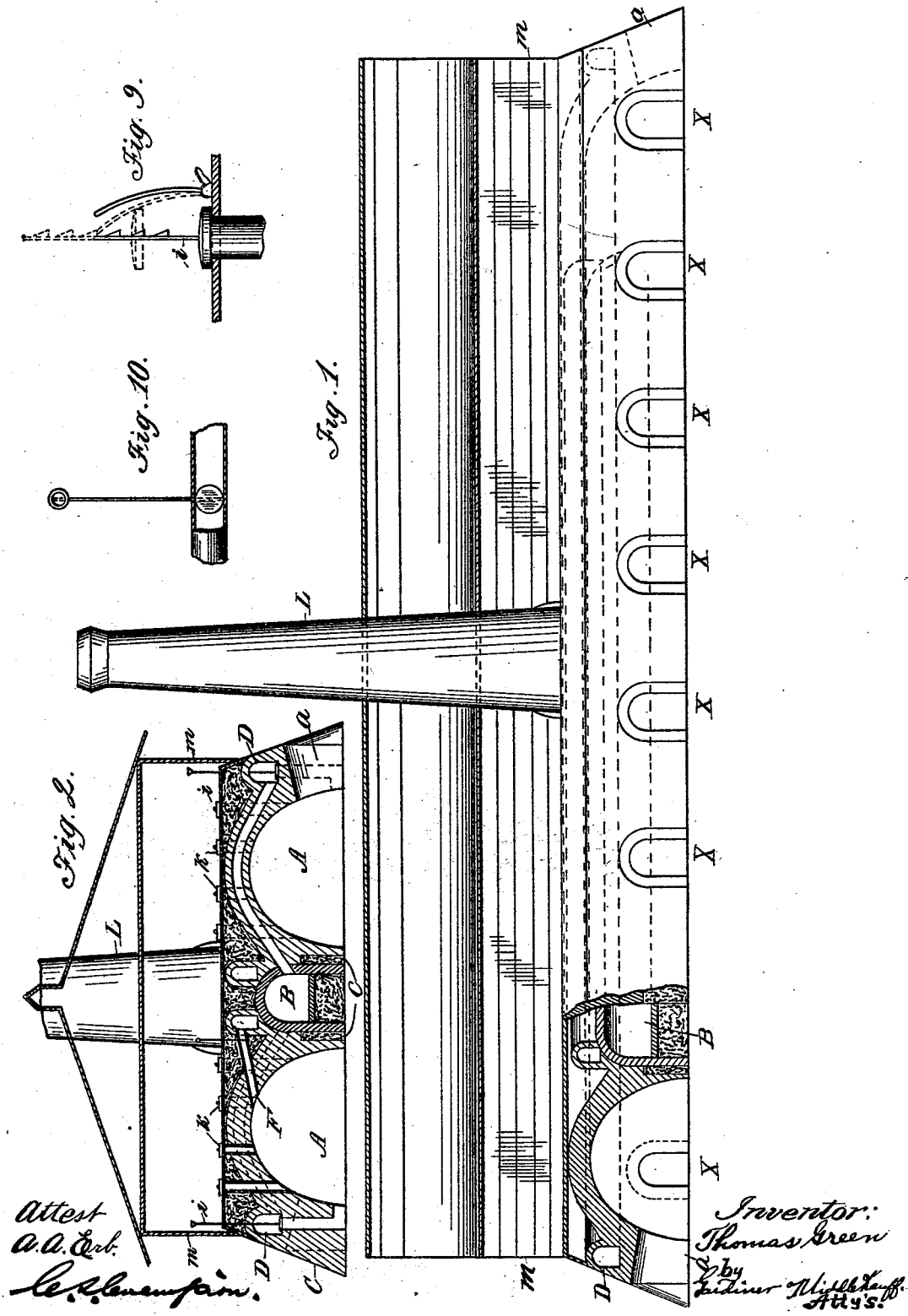

T. GREEN.
CONTINUOUS BRICK KILN.

No. 513,999. Patented Feb. 6, 1894.

Witnesses
Chas. E. Gorton.
Ernest J. Lees.

Inventor
Thomas Green
By Gardiner & Middlekauff
Attys.

(No Model.) 5 Sheets—Sheet 3.
T. GREEN.
CONTINUOUS BRICK KILN.

No. 513,999. Patented Feb. 6, 1894.

Witnesses
Chas. E. Gorton
Ernest J. Lees

Inventor
Thomas Green
By Gardiner & Middlekauff, Attys.

THE NATIONAL LITHOGRAPHING COMPANY,
WASHINGTON, D. C.

(No Model.) 5 Sheets—Sheet 4.
T. GREEN.
CONTINUOUS BRICK KILN.

No. 513,999. Patented Feb. 6, 1894.

Witnesses
Chas. E. Gorton
Ernest J. Lees.

Inventor
Thomas Green,
By Gardiner & Middlekauff,
Attys.

(No Model.) 5 Sheets—Sheet 5.

T. GREEN.
CONTINUOUS BRICK KILN.

No. 513,999. Patented Feb. 6, 1894.

Witnesses
Chas. E. Gorton
Ernest J. Clees.

Inventor
Thomas Green,
By Gardiner & Middlekauff
Attys.

THE NATIONAL LITHOGRAPHING COMPANY,
WASHINGTON, D. C.

United States Patent Office.

THOMAS GREEN, OF SIOUX CITY, IOWA, ASSIGNOR OF ONE-HALF TO THE SIOUX CITY BRICK AND TILE COMPANY.

CONTINUOUS BRICK-KILN.

SPECIFICATION forming part of Letters Patent No. 513,999, dated February 6, 1894.

Application filed April 20, 1891. Renewed November 17, 1893. Serial No. 491,276. (No model.)

*To all whom it may concern:*

Be it known that I, THOMAS GREEN, a citizen of the United States, residing at Sioux City, in the county of Woodbury and State of Iowa, have invented certain new and useful Improvements in Brick-Kilns; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to continuous brick kilns, and the object is to provide continuous flues, one kind of which shall regulate the draft and progress of the fire of the burning chambers, while another kind is adapted to utilize the surplus heat and conduct the same around the kiln to any desired chamber, and all the chambers and flues operate in conjunction with each other to produce uniform results.

My invention, therefore, consists in the novel construction and arrangement of the parts, and the combination thereof, as will be hereinafter fully described and pointed out in the claim.

I have fully and clearly illustrated my invention in the accompanying drawings, wherein—

Figure 3:
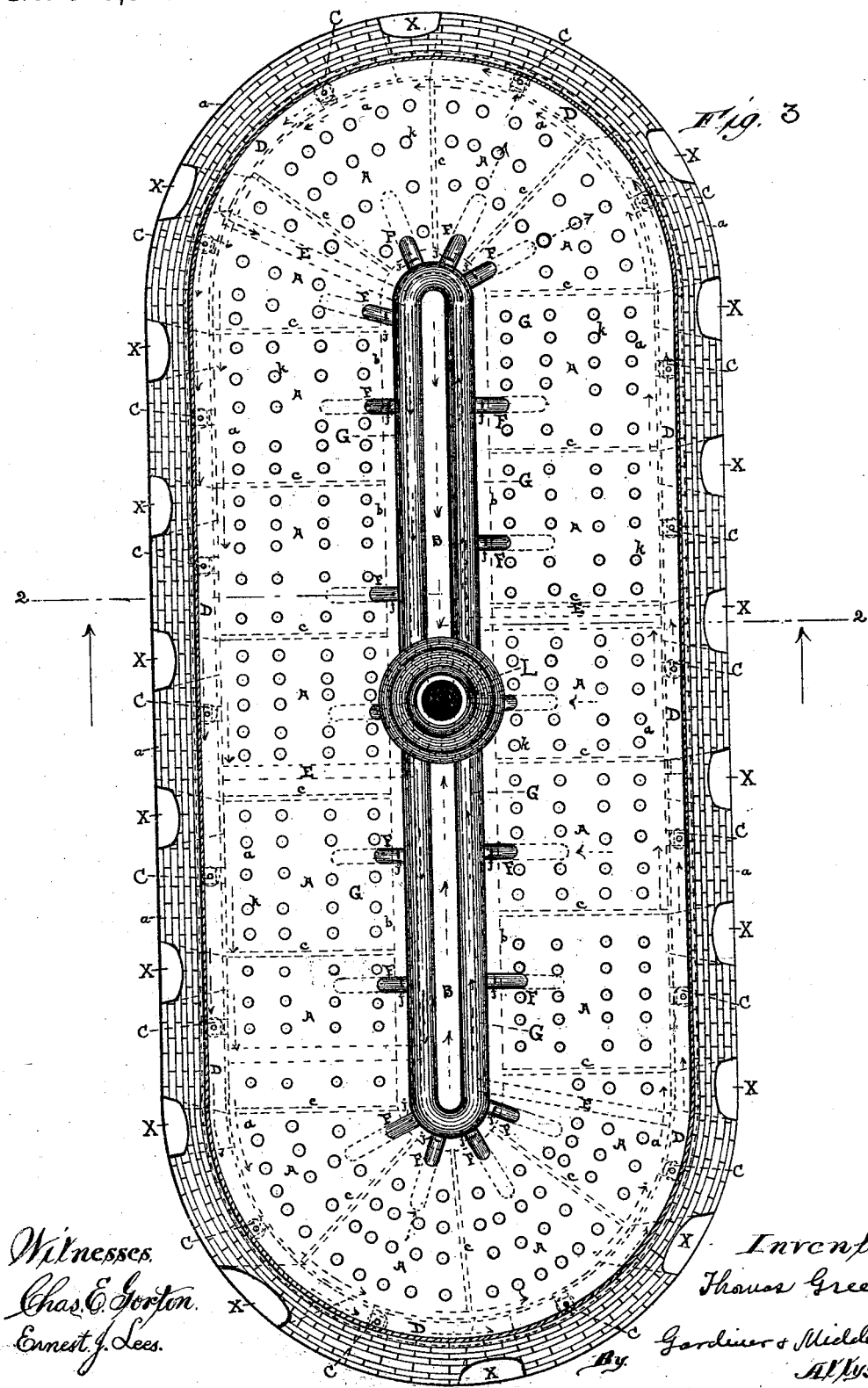
Figure 4:
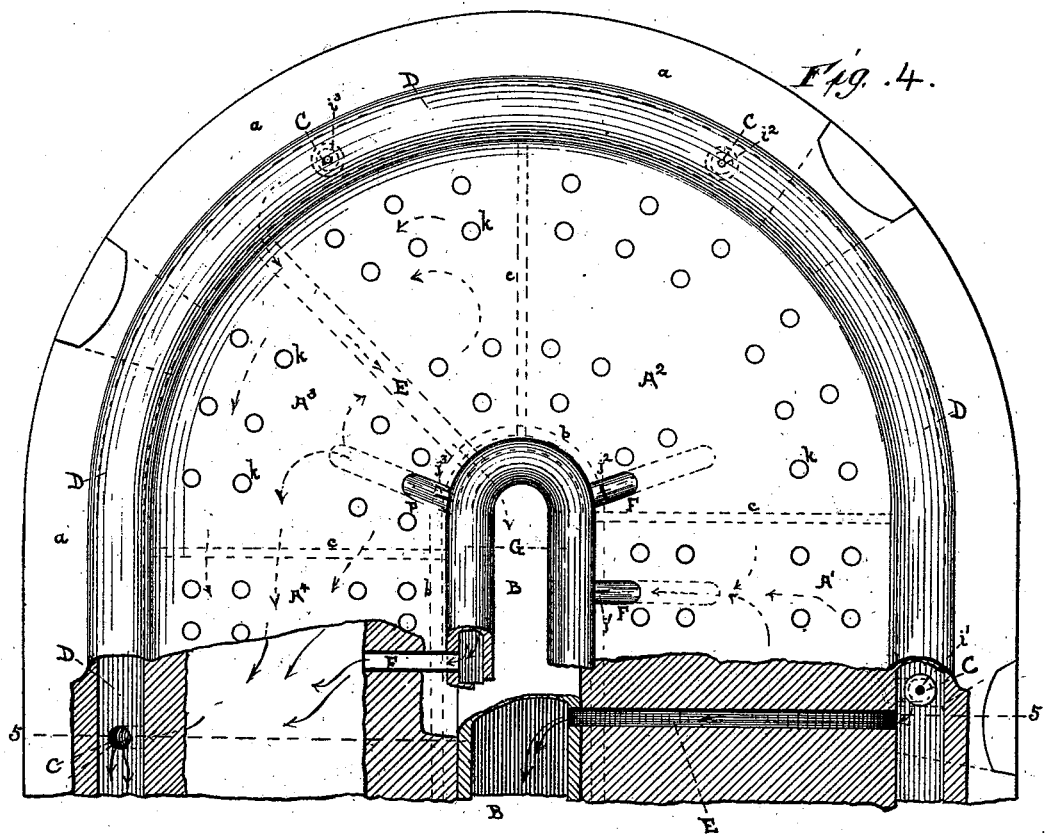
Figure 5:
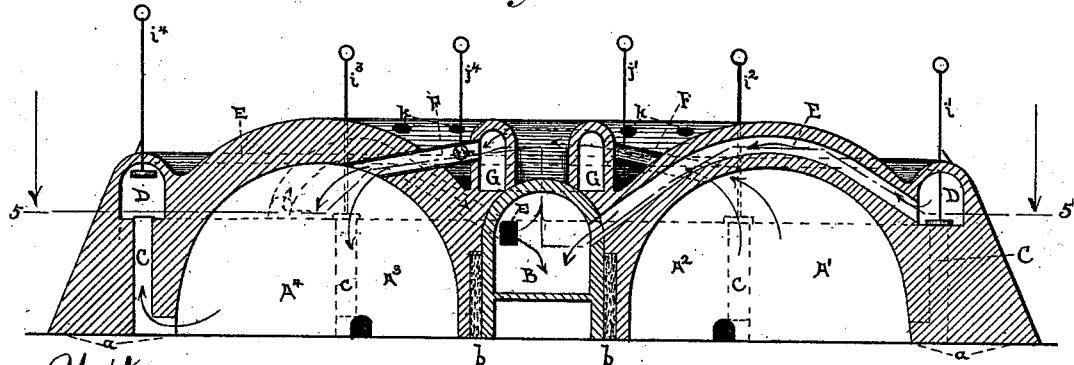
Figure 6:
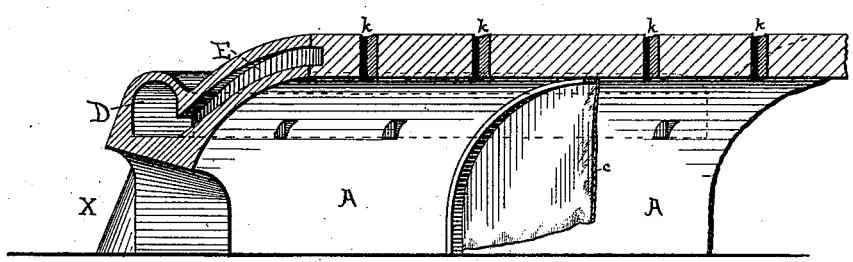
Figure 8:
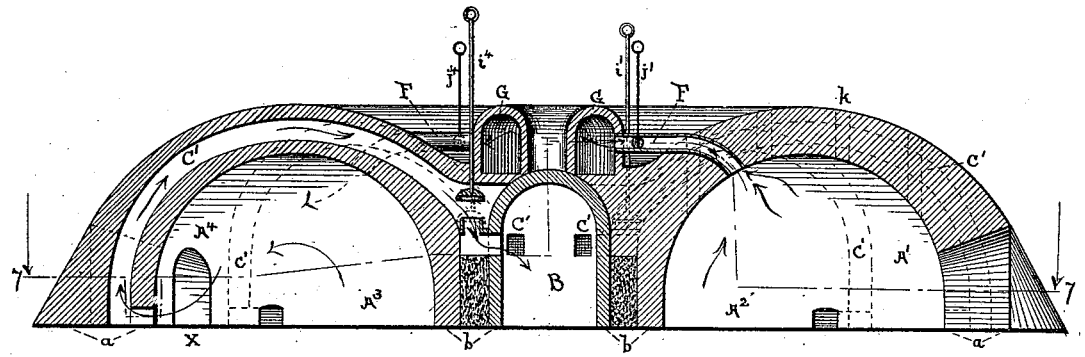
Figure 7:
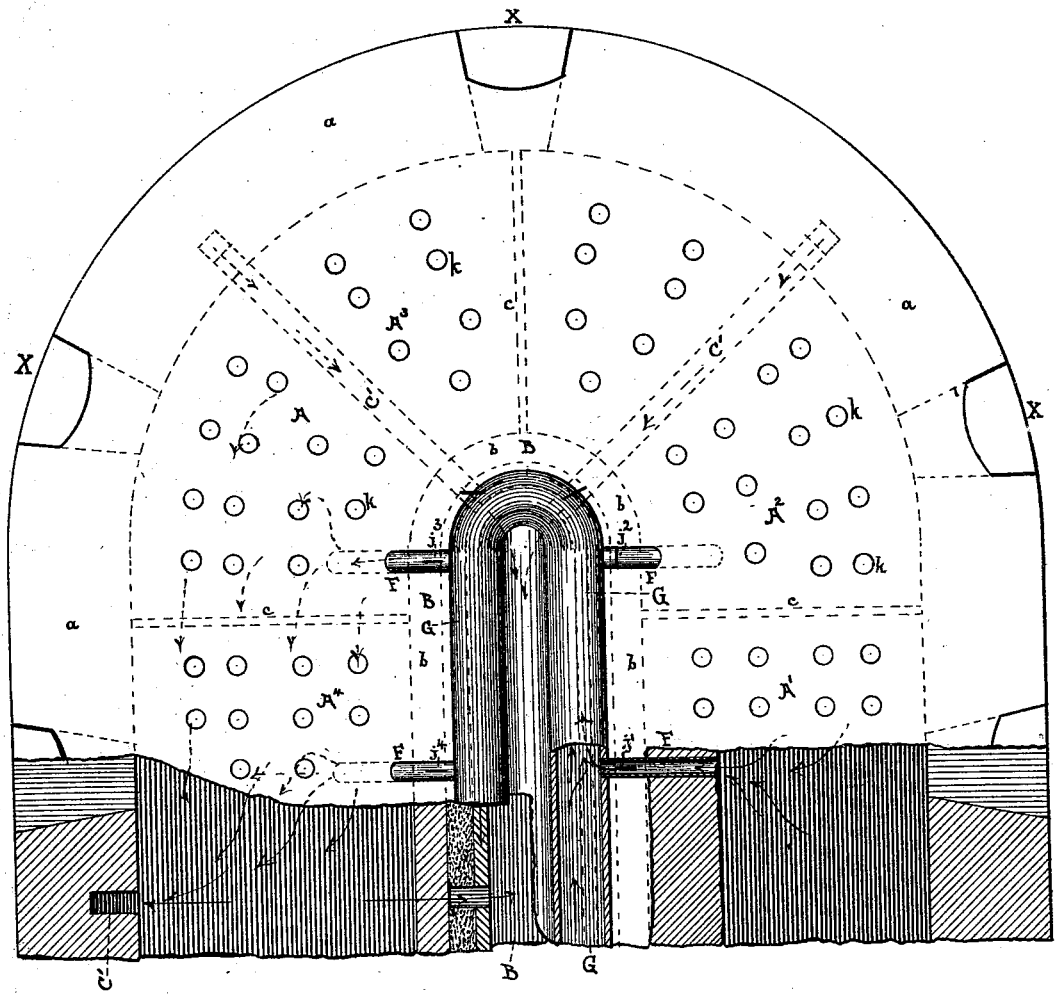

Figure 1, is a view of kiln in side elevation, showing one end in section. Fig. 2, is a sectional view taken through the width of the kiln, on line 2—2 Fig. 3. Fig. 3, is a plan view of Fig. 1. Fig. 4, is a detail plan view of portion of the kiln, partly in section. Fig. 5, is an enlarged detail sectional view taken on line 5—5 Fig. 4. Fig. 6, is an enlarged detail view of a portion of one of the chambers of the kiln, showing paper partition, fire holes, outer circular flue, and portion of cross flue, and door through side wall connecting with inner chamber. Fig. 7, is an enlarged detail plan view, partly in section of a portion of kiln of the modified form, taken on line 7—7 Fig. 8. Fig. 8, is a detail cross-sectional view of Fig. 7 of modified form of kiln. Fig. 9, is an enlarged detail view of damper, or check draft, used in outer circular flue, as shown in Figs. 4 and 5, and also in Fig. 8. Fig. 10, is an enlarged detail view, partly in section, of damper used in short flues, as shown in Figs. 5 and 8.

Referring now to these illustrations, where in like parts are designated by similar letters of reference, $a\ a$ represent the outside wall of the kiln.

$b\ b$ represent the wall portion of the kiln between the main chambers and the smoke chamber.

$c\ c$ represent the partitions used in dividing the kiln into separate chambers, and consist of paper or other light material which can be burned out readily, as will be hereinafter shown.

$i, i', i^2, i^3$ and $i^4$ are dampers, one being located over every side flue C, as shown in Fig. 5, and also one at the inner end of the flue C as shown in Fig. 8, and consist of a cap which can be drawn up to open, or let down to close the draft.

$j, j', j^2, j^3$ and $j^4$ represent another kind of damper used in the short flues F.

$k\ k$ represent fire holes located in the top of the kiln adapted to be fed and regulated from above, each being provided with a removable cap.

L is the smoke stack located in the center of the kiln.

$m\ m$ represent the frame roof of the kiln.

A $A'\ A^2\ A^3$ and $A^4$ represent the continuous chambers extending around the outside of the kiln, and capable of being entered through the openings $x$ as shown in Fig. 1.

B represents the smoke chamber located longitudinally between the chambers in the center of the kiln, and communicating directly with the smoke stack L.

C represents flues opening from each of the chambers A $A'$, &c., passing up the side walls of the chambers into the flue D, which is a continuous flue passing around the outside of the kiln. Over every third or fourth chamber, or as often as is necessary for the purpose of conducting the heat, pass cross flues E, Figs. 2, 3, 4 and 5, connecting the continuous flue D with the smoke chamber B, thus providing communication between the chambers A, $A'$, &c., and the smoke chamber and the stack L, by means of which the draft is furnished for the burning brick in the chambers.

By use of the dampers $i\ i'$, &c., over every side flue C, Figs. 4 and 5, the fire may be drawn successively from chamber to chamber. After the green brick has been set and one of the chambers fired, by closing the damper opposite the burning chamber and opening the dampers opposite the chambers ahead, the fire may be conducted ahead at the rate of about one chamber per day. As the fire progresses the paper partitions separating the chambers are burned out.

In Figs. 7 and 8 is shown a modified form of the kiln; the continuous outside flue D is omitted, and a flue C' leads directly from each chamber over the top of the chamber into the smoke chamber. The dampers $i$, $i'$, &c., are located at the inner extremities of the flues and near the smoke chamber, where they may be readily reached and repaired if out of order. The draft and progress of the fire are regulated as in the form before described. The surplus heat is utilized by the same kind of flues which will be described in connection with that form.

After the green brick in any chamber has been burned and the fire conducted ahead, and while the burned brick is cooling, there is considerable surplus heat arising from the burned brick and the heated chamber. To utilize this heat the flue G is provided. This flue is a continuous one, passing around the center of the kiln between the chambers and above the smoke chamber. It is connected with the chambers A, A', &c., by means of short flues F leading directly from every chamber, and regulated by the dampers $j$, $j'$, &c., which are located in the flues F near the flue G. By closing the damper over the side flue C, thus shutting off communication with the chambers ahead, the surplus heat is drawn from any chamber through the flue F into the continuous flue G. Thence by regulating the damper in the short flues, it may be conducted into any desired chamber and there mingled with the heat in the burning chamber. Thus as shown in Figs. 4 and 5 and in Figs. 7 and 8 showing the modified form of kiln, the damper $i'$ is closed, shutting off direct communication between the chamber A' and the smoke chamber. The brick in A' is burned and in $A^2$ is burning, while in $A^3$ and $A^4$ the green brick is just set and ready to be fired. It is desirable to conduct the surplus heat from A' past $A^2$ into $A^3$ and $A^4$. Dampers $j'$, $j^3$ and $j^4$ are opened and $j^2$ closed, and the heat is drawn from A' past $A^2$ and into $A^3$ and $A^4$, as shown by the direction of the arrows.

Having thus fully and completely described my invention, what I claim as new, and desire to secure by Letters Patent, is—

The combination in a continuous brick kiln, of a series of drying chambers having side flues leading therefrom, dampers for controlling said side flues, a continuous draft flue located above said side flues and communicating therewith, a smoke chamber located longitudinally between the drying chambers, and cross flues connecting said continuous draft flue with the smoke chamber, substantially as described.

In testimony whereof I affix my signature in presence of two witnesses.

THOMAS GREEN.

Witnesses:
 GUY C. RICH,
 IRVING L. CARPENTER.